May 31, 1949. H. E. KALTER 2,471,627
POST AND CLAMP MECHANISM FOR CYCLE SADDLES
Filed July 12, 1946
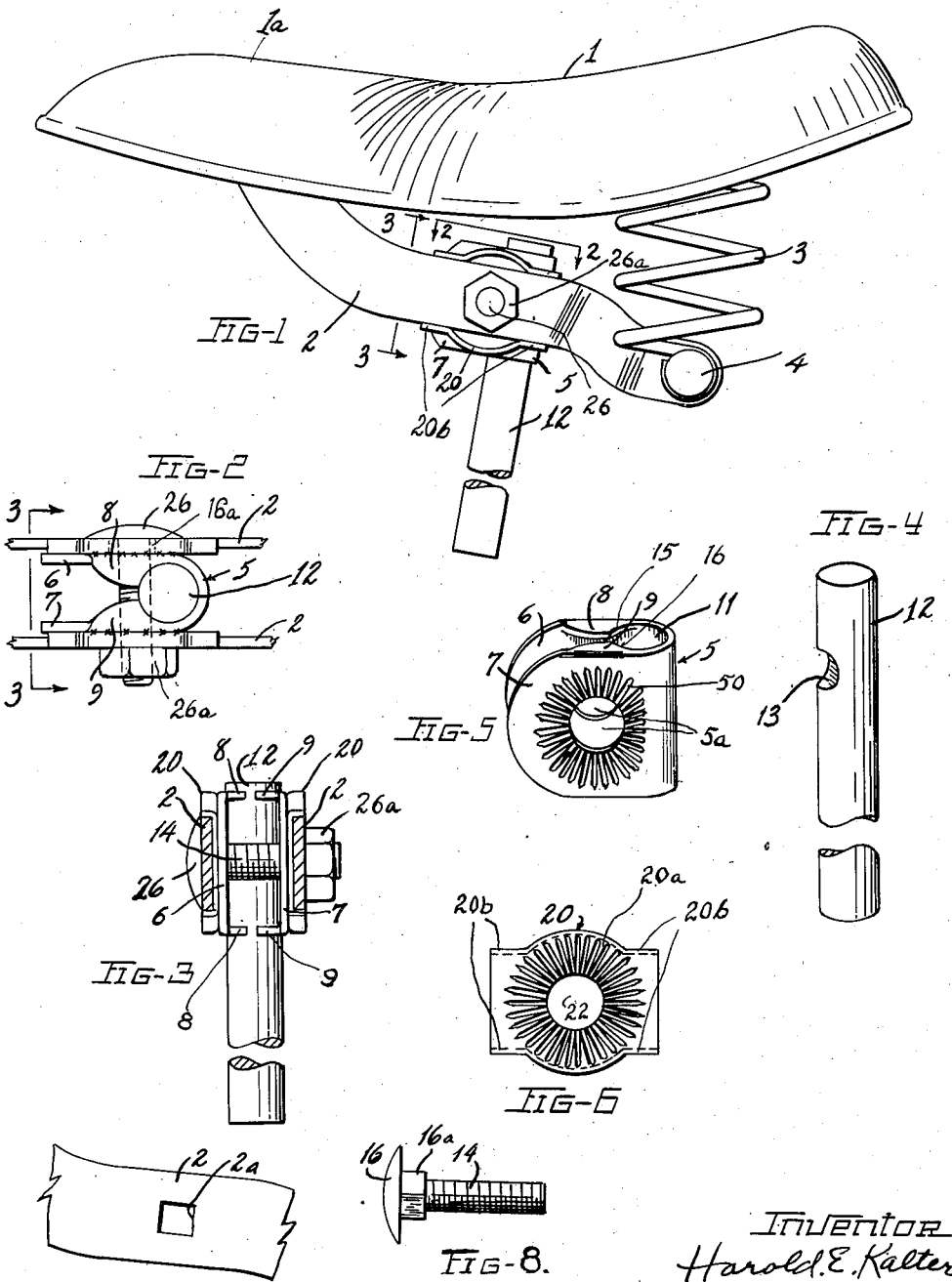
Inventor
Harold E. Kalter
By Frank M. Slough,
His Attorney Patented May 31, 1949

2,471,627

UNITED STATES PATENT OFFICE 2,471,627

POST AND CLAMP MECHANISM FOR CYCLE SADDLES

Harold E. Kalter, Elyria, Ohio, assignor to The Troxel Manufacturing Company, Elyria, Ohio, a corporation of Ohio Application July 12, 1946, Serial No. 683,275

5 Claims. (Cl. 155—5.24)

My invention relates to a post and clamp mechanism for cycle saddles and relates more particularly to such a mechanism employing a substantially straight post.

An object of my invention is to provide a post and clamp mechanism adapted to rigidly support a cycle saddle by an intermediate portion of the saddle reach bars in such manner that the cycle saddle may be adjustably tilted.

Another object of my invention is to achieve the aforesaid object in a mechanism which is very efficient in use though adapted for construction in quantities at low cost.

My invention and other objects thereof will be clearly understood by reference to the accompanying drawings of a perfect embodiment of my invention, and to the description of the said embodiment forming a part of this specification.

Referring to the drawings:

Fig. 1 is a side elevational view of a typical cycle saddle to which the improved clamp and post mechanism of the said embodiment, is shown as attached to hold the seat in tilted adjusted position;

Fig. 2 is a top plan view of the post and clamp mechanism of Fig. 1, illustrating a medial fragment of the reach members of the cycle saddle assembly of Fig. 1;

Fig. 3 is an end elevational view of the parts shown in Fig. 2;

Fig. 4 is a view of the post per se;

Fig. 5 is a perspective view of the post gripping element, also illustrated in the foregoing figures;

Fig. 6 is a side elevational view of the part shown in Fig. 5;

Fig. 7 is a side elevational view of one of the reach member fragments as shown in Fig. 2;

Fig. 8 is a side elevational view of the clamping bolt.

Referring now to the drawings in all of which like parts are designated by like reference characters, the typical cycle saddle shown comprises the usual seat 1, a pair of relatively parallel longitudinally extending sheet metal reach members 2, said members being suitably secured to the seat below the front end portion 1a, and at their rear ends, supporting a pair of lateral interspaced compression springs 3 which are suitably secured below a relatively rearward portion of the seat and are respectively secured at 4 at their lower ends to the rear ends of the reach members.

The cycle saddle post 12 comprises a preferably straight rod preferably having a transverse groove 13 presented from one of its sides near its upper end, and its lower end is adapted for downward projection within the post socket of a cycle where in the usual way it is firmly clamped, by well-known means which are not involved in the present invention.

The medial portions of both reach members 2 are provided with aligned apertures 2a, at least one of which is of rectangular or other noncircular form. The inner surfaces of the reach members 2 which provide the aperture may be suitably indentured to afford a frictional gripping surface or preferably as shown, the reach members 2 may each support an inwardly indentured stamping 20 to provide a frictionally gripping clamping surface such as 20a.

Referring to Fig. 6 the element 20 is preferably a shallow channel-shaped stamping having upper and lower pairs of flange portions 20b—20b, each of which being adapted to embracingly engage upper and lower edges of the associated reach member 2. The intermediate portion of the elements 20 is progressively widened to afford a sufficient width of the channel web surface to apply the indenturing grooves 20 which extend radially of the center aperture 22 of the stamping 20.

Shallow flanges 20b extend from end to end of the stamping, but only their end portions make embracing engagement with the reach member edges. The indentations 20a are provided on the side of the stamping opposite to that from which the flange portions 20b extend, and the stampings 20 are mounted on the reach members 2 to cause their indentured surfaces to be relatively confronting.

The said stampings 20 are carried by the reach members and afford suitably indentured facing surfaces therefor. In Fig. 5 a generally U-shaped clamp element 5 is shown, formed from a piece of flat sheet steel material and bent into the U-shape, said clamp element having a pair of perforated relatively parallel arms 6 and 7, and having flange jaw portions 8 and 9 projecting inwardly from the top and bottom portions of the arms 6 and 7.

The outer faces of the two arms at 50 are provided with a circularly arranged set of radially extending indentured depressions, adapted to engage with the similar depressions at 20a of the member 20, and the jaw flanges 8 and 9 have inwardly facing curved edges 15 and 16 which curvilinearly merge with the semicylindrical surface of the web 11 of the clamp, thereby affording guides for positioning the post 12 in engagement with the inner surface of the web which is confined against said web by the effect of pressure engagement of a forward portion of the post surface with the flange edge surfaces 15 and 16.

The upper end of the post therefor may be projected upwardly between the jaw edges and said web while rotated to present the notch 13 foremost, that is, toward the ends of the arms 6 and 7.

With a pair of the shallow channel-shaped members 20 each respectively positioned on a different one of the reach members 2, and with their indentured surfaces 20a disposed in relatively confronting relationship, the member 5, with the post 12 frictionally pendantly supported thereby, is interposed between the opposing indentured surfaces of the stampings 20.

The stem bolt 16 is then advanced through the rectangular opening 2a of the remotely disposed first reach member 2, through the aperture 22 of the stamping 20 which is affixed thereto, then through the aligned apertures 5a of the clamp 5, and through aligned apertures of the other stamping 20 which is affixed to the second reach member 2, and through the aperture thereof, the nut 26a being then screw-threaded onto the stem 14 of the bolt 16 which is shown in Fig. 8.

Thus the head of the bolt 16 is disposed at one side of the first reach member 2 and the nut 26a is disposed at the other side of the other reach member as best shown in Fig. 2. In such case the arms 6 and 7 together with their respective jaws 8 and 9 are projected to considerable inwardly directed pressure when the nut 26a is turned on to the stem 14 of the bolt. The squared shank 16a of the bolt being fitted within the rectangular aperture 2a of the first reach member prevents the bolt from turning during the clamping rotational movement of the nut 26a. Such clamping effectuates inwardly directed pressure on the clamping jaws 8 and 9 with the result that the frictional grip exercised by the jaws 8 and 9 and also the surface 11 of the clamping member is intensified.

As an important additional feature of improvement the arcuate notch 13 is positioned with its arcuate surface concentric with the aligned apertures 5a of the clamp 5 so that when the bolt stem 14 is projected through the apertures 5a the arcuate surface of the notch 13 will be subject to engagement by the bolt stem 14 to thus key the bolt 14, clamp 5, and post 12 together, thus preventing up-and-down sliding of the clamp channel on the post.

Therefore, frictional clamping engagement of the clamp with the post is not mainly relied upon to prevent longitudinal displacement of the clamp with respect to the upper portion of the post which clamp is relied upon more particularly to hold the cycle saddle from tilting.

It will be well understood from the present practice in this art that the radially extending indentured grooves 50 of the clamp and 20a of the reach member facings 20 are provided for the purpose of preventing tilting of the cycle seat from a desired position of adjustment, and that also by unscrewing the nut 15 to loosen the clamp, that the seat can then be tilted to the desired tilting adjustment position and retained in such position by retightening the nut, and that the keying effect of the bolt stem portion which is projected within the notch 13 of the post 10 will effectually prevent the up and down sliding of the assembled seat and clamp mechanism on the post 12 during the period of making the tilting adjustment or subsequent readjustment.

Having thus described my invention in a single embodiment, I am aware that numerous and extensive departures may be made from the embodiment herein illustrated and described but without departing from the spirit of my invention.

I claim:

1. A cycle saddle post and clamp assembly comprising in combination with a pair of laterally spaced, longitudinally extending reach bars having transversely aligned apertures, a pair of indentured apertured members each carried by one of said reach bars, a substantially U-shaped clamp bent from a piece of flat sheet steel material and affording a web and a pair of intermediately apertured side arms, said arms positioned between, while extending longitudinally of, said bars, the outer surface of each arm disposed flatwise in contiguous relation to an inner surface portion of a different indentured member, a substantially upright post having a transverse notch on a side of its upper end portion, said upper portion adapted to be disposed between said arms and its unnotched surface portions to be concurrently engaged with inner surface portions of said arms and an inner surface portion of said web, and said notch being presented towards the space between the ends of the arms, and bolt means comprising a stem portion adapted to be projected successively through a bar aperture, said indentured member and clamp arm apertures, and the other bar aperture and concurrently to pass through and be embraced by said post notch, and said bolt means adapted for adjustment to inwardly compress said bars against the indentured members, to inwardly compress the side portions of the clamp arms against the sides of the post.

2. A cycle saddle post and clamp assembly adapted to be clamped between a pair of longitudinally extending, laterally spaced, and medially apertured reach bars of a cycle seat, each of said reach bars carrying an indentured apertured member, comprising a substantially U-shaped sheet metal clamp having apertured side arms adapted to extend from the web portion in the longitudinal direction of the reach bars, said clamp being interposed between the reach bars, and a substantially upright post having a rear side engaged with the clamp web and adjacent sides engaged with the adjacent arm portions and its forward portion being transversely notched and a bolt extending through said bar and indentured member apertures and said arm apertures with its medial portion projected through said post notch, said bolt adapted to exert inwardly directed pressure on the reach bars, said bars transmitting said pressure to said indentured members and clamp arms, and said clamp arms responsive to said pressure adapted to grip said post.

3. A cycle post and clamp mechanism for a cycle saddle, comprising in combination with a pair of relatively laterally spaced, inwardly compressible, seat supporting reach bars, a substantially straight upright post having a transverse notch extending inwardly of a side of its upper end portion, a pair of indentured apertured members each carried by one of said reach bars, clamp means affording an upwardly extending passage receiving said upper post end portion, said clamp means disposed between said indentured members and reach bars, a bolt projected between said bars to inwardly compress the same and said indentured members, said clamp means being thereby clamped between said inwardly compressed bars, and said post presenting its transverse notch to an intermediate portion of said bolt to embrace the same, to prevent relative longitudinal movement of said post with respect to the relatively clamped bars indentured members and clamping means.

4. The cycle post and clamp mechanism substantially as set forth in claim 3, said indentured members providing means for relatively interlocking said reach bars and clamping means, responsive to inward compression of said bars by said bolt, said locking means adapted to permit said bars to be relatively tilted with respect to the recited post and said clamping means, to different angles, and maintained in any of a plurality of different positions responsive to tightening of said bolt.

5. A cycle post and clamping mechanism for a cycle saddle, comprising in combination with apertured reach means disposed below the seat and secured to the fore and aft portions of the under side of said seat, a pair of transversely spaced inwardly movable apertured elements medially carried by said means, said elements having relatively opposing spaced indentured surfaces, a compressible clamp disposed between and engaged with said element surfaces by cooperatively similarly indentured surfaces of said clamp, said clamp affording an upwardly extending post receiving passage, a substantially straight upright post having an upper end portion projecting within said passage, and a bolt projected laterally through said reach means and carried elements and said interposed clamp means, the engagement of the indentured surfaces of said reach carried elements with those of said clamp responding to the clamping pressure of said bolt to contract said passage whereby to grip said post, the upper end portion of said post being formed to provide a transverse bolt receiving passage, said bolt traversing the passage to interlock said post and clamp.

HAROLD E. KALTER.

REFERENCES CITED

The following references are of record in the file of this patent:

UNITED STATES PATENTS

| Number | Name | Date |
| --- | --- | --- |
| 1,391,409 | Roberts | Sept. 20, 1921 |

FOREIGN PATENTS

| Number | Country | Date |
| --- | --- | --- |
| 232,815 | Great Britain | Feb. 16, 1925 |